(12) United States Patent
Van Tilburg et al.

(10) Patent No.: US 11,554,614 B2
(45) Date of Patent: Jan. 17, 2023

(54) TIRE WITH MEANS FOR SETTING OUT STUDS AT THE TIRE SURFACE, AND METHOD

(71) Applicant: DRIVE TECHNOLOGY HOLLAND LTD. [NL/NL], Best (NL)

(72) Inventors: Marinus Johannes Cornelis Van Tilburg, Best (NL); Henricus Josephus Maria Essens, Best (NL); Johannes Constant Maria De Wijs, Best (NL); Hubertus Hendrikes Adrianus Van Kasteren, Best (NL)

(73) Assignee: DRIVE TECHNOLOGY HOLLAND LTD., Best (NL)

( * ) Notice: Subject to any disclaimer, the term of this patent is extended or adjusted under 35 U.S.C. 154(b) by 347 days.

(21) Appl. No.: 16/328,505

(22) PCT Filed: Aug. 30, 2017

(86) PCT No.: PCT/NL2017/050573
§ 371 (c)(1),
(2) Date: Feb. 26, 2019

(87) PCT Pub. No.: WO2018/044165
PCT Pub. Date: Mar. 8, 2018

(65) Prior Publication Data
US 2021/0086564 A1    Mar. 25, 2021

(30) Foreign Application Priority Data

Sep. 5, 2016   (NL) ..................................... 2017415

(51) Int. Cl.
*B60C 11/14*   (2006.01)
*B60C 11/16*   (2006.01)

(52) U.S. Cl.
CPC ...... *B60C 11/1612* (2013.01); *B60C 11/1637* (2013.01)

(58) Field of Classification Search
CPC ..... B60C 11/02; B60C 11/16; B60C 11/1606; B60C 11/1612; B60C 11/1637
See application file for complete search history.

(56) References Cited

U.S. PATENT DOCUMENTS 2,708,470 A * 5/1955 Gramelspacher ....... B60C 11/18
                                                                 152/208
3,095,918 A * 7/1963 Mike .................. B60C 11/1612
                                                                 152/208

(Continued)

FOREIGN PATENT DOCUMENTS

CN    201056140 Y    5/2008
DE      2031993 A1   1/1972

(Continued)

OTHER PUBLICATIONS

International Search Report for International Application No. PCT/NL2017/050573 dated Nov. 6, 2017.

*Primary Examiner* — Cedrick S Williams
(74) *Attorney, Agent, or Firm* — Suiter Swantz pc llo

(57) ABSTRACT

Tyre for a wheel of a vehicle, with a profiled tread for supporting the vehicle on the ground, provided with an adjustment device for adjusting a tread pattern height of the profiled tread. Method for at least partly replacing a profiled tread of such a tyre.

11 Claims, 5 Drawing Sheets

(56) References Cited

U.S. PATENT DOCUMENTS 3,672,421 A * 6/1972 Anderson .......... B60C 11/1612
　　　　　　　　　　　　　　　　　　　　152/208
3,872,908 A * 3/1975 Einarsson .......... B60C 11/1612
　　　　　　　　　　　　　　　　　　　　152/208

FOREIGN PATENT DOCUMENTS

| DE | 3528211 A1 | | 2/1986 | | |
|----|----|----|----|----|----|
| DE | 3721500 A1 | * | 1/1989 | ......... | B60C 11/1612 |
| DE | 19710434 A1 | | 9/1998 | | |
| DE | 29912340 U1 | * | 5/2000 | ......... | B60C 11/1606 |
| GB | 190916185 A | * | 7/1909 | ......... | B60C 11/1637 |
| WO | WO-0170519 A1 | * | 9/2001 | ......... | B60C 11/1612 |

* cited by examiner

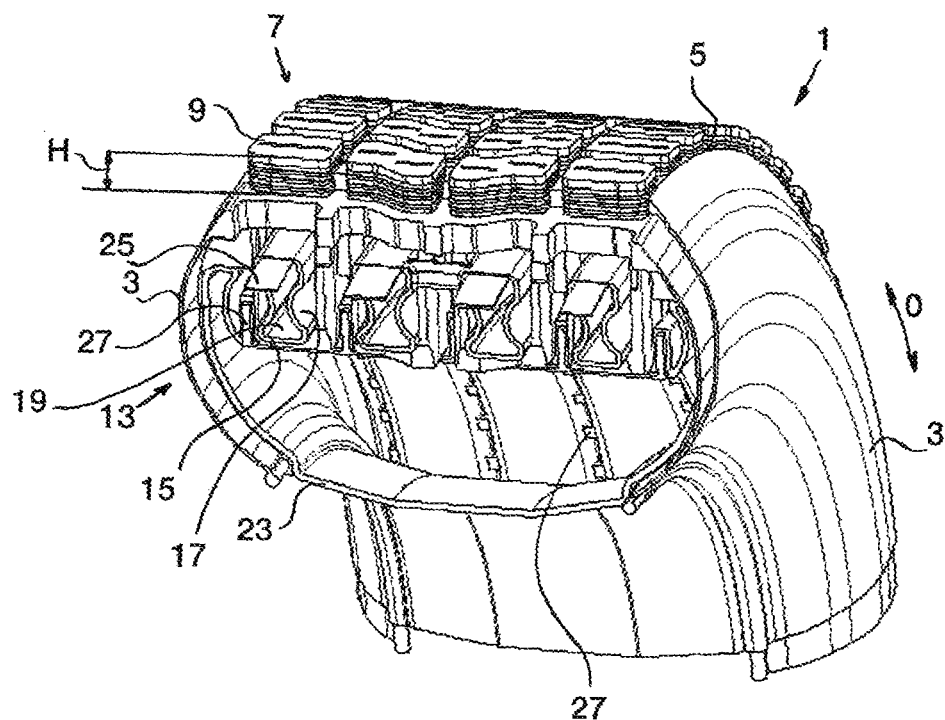
Figure 3
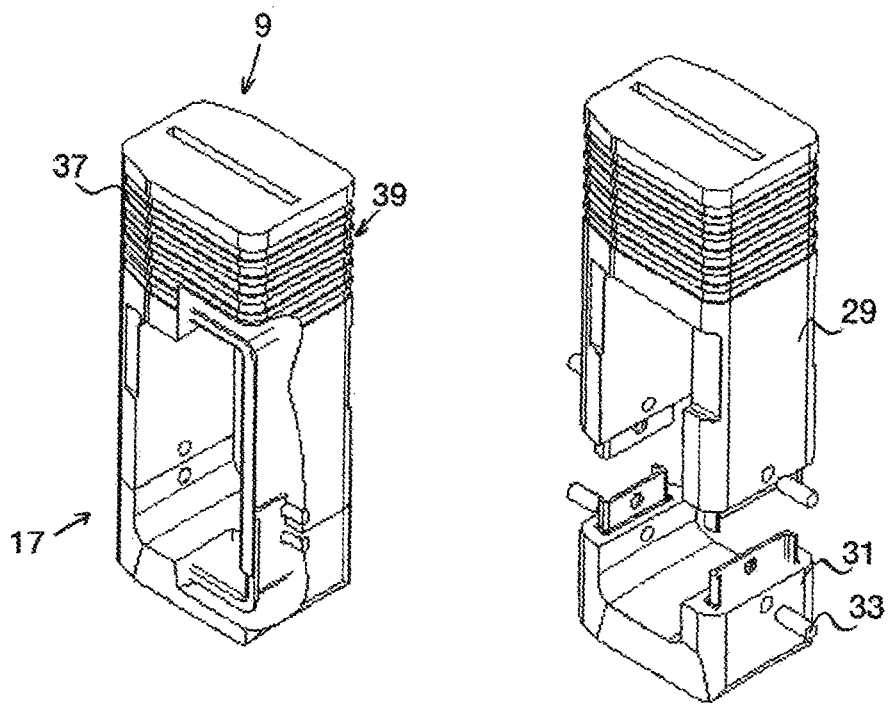 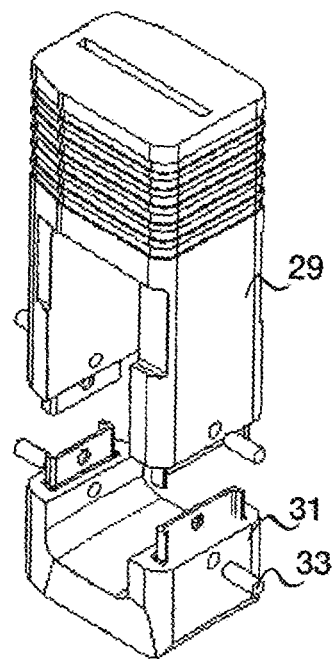
Figure 4  Figure 5

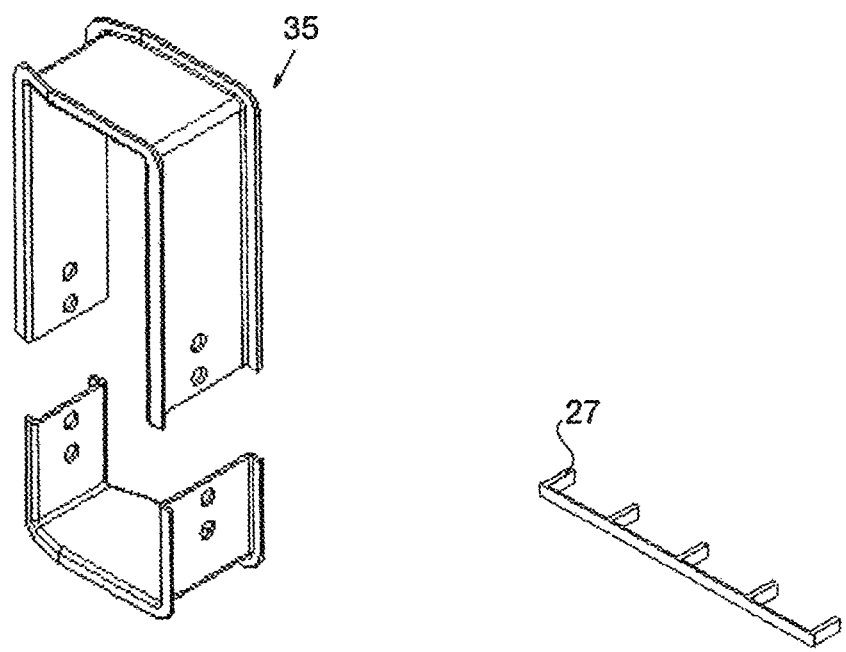
Figure 6
Figure 7
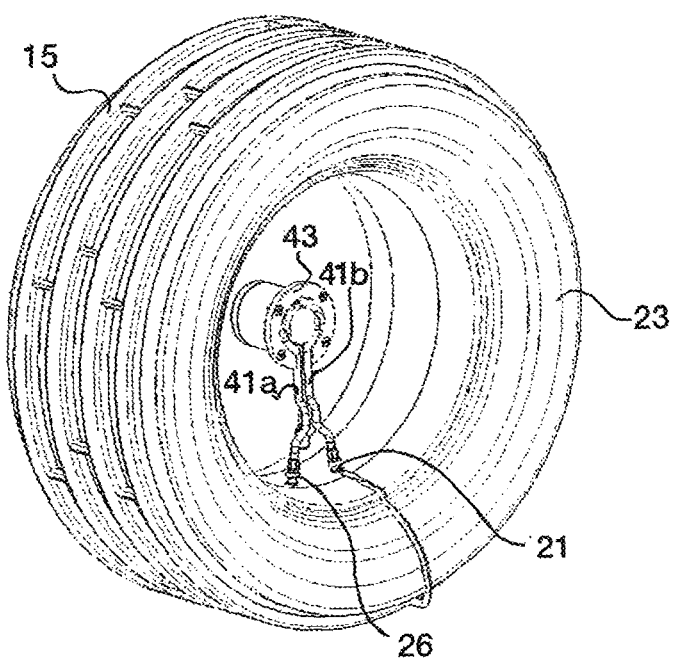
Figure 8

TIRE WITH MEANS FOR SETTING OUT STUDS AT THE TIRE SURFACE, AND METHOD

TECHNICAL FIELD AND BACKGROUND

According to a first aspect, the invention relates to a tyre for a wheel of a vehicle, with a profiled tread for supporting the vehicle on the ground.

According to a second aspect, the invention relates to a method for at least partly replacing a profiled tread of a tyre according to the first aspect of the present invention.

In a third and fourth aspect, the invention provides a wheel and a vehicle provided with such a tyre according to the invention.

With known tyres for a vehicle, such as a car, the tread pattern is formed by recesses in a tyre body. By arranging such recesses in a structured way, it is possible to obtain a desired tread pattern, wherein the depth of the recess determines the tread pattern height. A drawback of such known tyres is that the use of these tyres is limited with regard to the various different operating conditions of the tyre. In addition, the service life of the tyre can be improved.

BRIEF SUMMARY

It is therefore an object of the present invention to provide a tyre which can be used efficiently under various operating conditions.

This object is achieved by the tyre according to the present invention, such as defined in claim 1, for a wheel of a vehicle, with a profiled tread for supporting the vehicle on the ground, provided with a tyre body formed by two opposite side walls and a circumferential wall, wherein the tyre body is configured to maintain an adjustable gas pressure in the tyre, wherein the circumferential wall is provided with a number of holding spaces;

a number of tread pattern elements which form at least part of the tread, wherein each of the number of tread pattern elements is accommodated in a holding space of the number of holding spaces so as to be displaceable at substantially right angles to the circumferential wall between a first position, in which it projects from the circumferential wall to a greater degree, and a second position, in which it projects from the circumferential wall to a lesser degree or is accommodated in the circumferential wall;

an adjustment device which is configured to displace the number of tread pattern elements in the number of holding spaces between the first and second position in order to adjust a tread pattern height of the profiled tread.

As each of the number of tread pattern elements is provided in a holding space at substantially right angles to the circumferential wall, i.e. projecting radially from the circumferential wall and displaceable, with the tyre being provided with an adjustment device which is configured to displace the number of tread pattern elements in the number of holding spaces for adjusting the tread pattern height, the tread pattern height is adjustable to the operating conditions of the tyre, as a result of which the tyre according to the invention is suitable for use in various operating conditions. In rainy weather, for example, the tread pattern height can be increased, whereas in dry weather the tread pattern height can be reduced, even down to zero.

A further advantage is the fact that any wear of the tread pattern elements can be taken into account in order to maintain a desired tread pattern height. If a person, such as a driver of a vehicle to which the tyre is fitted, or alternatively an automatic system detects wear of the tyre at the location of the tread due to contact of the tread of the tyre with a surface during use, resulting in a reduction of the tread pattern height to below a desired height, the desired tread pattern height can be restored by adjusting the tread pattern height by means of the adjustment device.

An additional advantage is the fact that a tyre according to the present invention is relatively durable since the service life of the tyre is extended by replacing tread pattern elements.

Preferably, the tread pattern elements, at least in an area thereof which, during use, is in contact with the circumferential wall, have a constant cross section, in which a cross section of the holding spaces is adapted to the shape of the cross section of the tread pattern elements.

Preferably, the adjustment device comprises a spring device which is configured to provide resistance due to the spring action of the spring device, for the benefit of each of the number of tread pattern elements, when displacing a tread pattern element of the number of tread pattern elements to the first position in which it projects from the circumferential wall to a greater extent. With this advantageous spring device, the tread pattern elements move to the first position when the resistance ceases. This is particularly advantageous in order to achieve a relatively large tread pattern height in the event that the spring action is interrupted due to, for example, a fault.

In this case, it is advantageous if the adjustment device is configured for adjusting the degree of spring action of the spring device. By adjusting the spring action, the tread pattern height can be adjusted to a desired height.

In a practical embodiment, the tyre is configured, for the benefit of each of the number of tread pattern elements, to offer resistance due to the maintainable gas pressure in the tyre when displacing the number of tread pattern elements in the direction of the second position and configured to displace the number of tread pattern elements in the direction of the first position, in which it projects from the circumferential wall to a greater extent, when the gas pressure maintained in the tyre is increased, as with an inner tube of the tyre mentioned below, in which the adjustment device is also configured for adjusting the gas pressure maintained in the tyre. This is advantageous for moving the number of tread pattern elements between the first position and the second position in cooperation with the spring action of the spring device.

It is preferred if each of the number of tread pattern elements is provided with a passage, wherein the adjustment device extends through the passage of each of the number of tread pattern elements. As a result thereof, the adjustment device is reliably coupled to each of the number of tread pattern elements in order to move the number of tread pattern elements.

In this case, it is advantageous if each of the number of holding spaces extends through the circumferential wall, i.e. is continuous, and each of the number of tread pattern elements extends through the circumferential wall, wherein the spring device, on the (inner) side of the circumferential wall facing away from the tread, extends through the passage of each of the number of tread pattern elements and, for the benefit of the spring action, rests on the (inner) side of the circumferential wall facing away from the tread. In this way, a height-adjustable tread pattern can be produced in a practical manner, in which the spring device is operational between a delimitation on an underside, inside the tyre, of the passage of each tread pattern element, and the inner side of the circumferential wall of the tyre.

It is advantageous if each tread pattern element of the number of tread pattern elements comprises a reinforcing frame surrounding the passage, wherein the reinforcing frame preferably comprises a composite material. A reinforcing frame is advantageous for coupling a tread pattern element to the adjustment device in a reliable and durable manner.

In a practical embodiment, each tread pattern element of the number of tread pattern elements is formed as a composite tread pattern element, wherein the part of each tread pattern element of the number of tread pattern elements surrounding the passage is dividable in order to fit the adjustment device in the passage. Such a dividable tread pattern element is particularly advantageous for removing the adjustment device from the passage, for example for replacing a tread pattern element.

In an embodiment, the number of tread pattern elements is arranged in rows, with the spring device comprising a number of spring elements extending parallel to each other which corresponds to the number of rows of tread pattern elements and which are each configured to offer resistance due to spring action of the spring element, for the benefit of each of the number of tread pattern elements of a row of tread pattern elements, when moving the number of tread pattern elements of a row of tread pattern elements to the first position, in which it projects from the circumferential wall to a greater degree, in order to increase the tread pattern height, wherein each spring element extends through the passage of each of the number of tread pattern elements of the row of tread pattern elements. This is advantageous for adjusting the tread pattern height per row. The number of rows preferably extend in a circumferential direction of the tyre, that is to say in the rolling direction of the tyre during use thereof.

Preferably, inside the tyre, the number of tread pattern elements rests on an inner tube provided in the tyre.

In this case, it is advantageous if a reinforcing element is provided on the sides of the spring elements facing away from the tread in order to rest the spring elements and/or tread pattern elements on an inner tube provided in the tyre. This is advantageous in order to rest the spring elements and/or tread pattern elements on the inner tube in a relatively reliable manner. In an embodiment, the reinforcing element is connected to the inner tube or forms part thereof.

It is advantageous if the spring device comprises an endless hollow cord, wherein a cavity of the endless hollow cord is filled, or at least can be filled, with a fluid, preferably a gas, such as air or nitrogen, for adjusting the spring action of the spring device. A fillable endless hollow cord is advantageous for adjusting the spring action in a practical manner.

In a practical embodiment, each tread pattern element of the number of tread pattern elements is made of a material comprising rubber, preferably vulcanised rubber. A rubber material is advantageous in order to provide a relatively durable tread having a desired degree of friction with the ground when using the tyre.

It is advantageous if each tread pattern element of the number of tread pattern elements comprises a tread pattern part adjoining the tread, wherein the tread pattern part is provided with a ribbed surface on the side facing the holding space in order to discharge pollutants from the holding space to outside the tyre, that is to say any pollutants, including moisture, which penetrate between the circumferential wall of the tyre and a tread pattern element from outside the tyre.

Due to the ribbed surface cooperating with the wall of the holding space when moving a tread pattern element, discharge of pollutants can be achieved. This is advantageous for a relatively reliable operation of the tyre.

According to a second aspect, the present invention relates to a method for at least partly replacing a profiled tread of a tyre according to the first aspect of the present invention. The method comprises the following steps:

a) removing the adjustment device from the passage of a tread pattern element;
b) removing the tread pattern element from the holding space of the circumferential wall;
c) placing a replacement tread pattern element in the holding space cleared during step b);
d) arranging the adjustment device in the passage of the replacement tread pattern element fitted during step c).

This method is advantageous for replacing a tread pattern element, preferably all tread pattern elements, in a relatively practical manner in order to achieve a relatively long service life of the tyre.

In this case, it is advantageous if each tread pattern element of the number of tread pattern elements is formed as a composite tread pattern element, wherein the part of each tread pattern element of the number of tread pattern elements surrounding the passage being dividable in order to arrange the adjustment device in the passage that, prior to step a), the tread pattern element is divided for the benefit of removing the adjustment device from the passage of the tread pattern element during step a). This is advantageous in order to reduce the effort required to replace a tread pattern element.

BRIEF DESCRIPTION OF THE DRAWINGS

The present invention will be explained below by means of the description of a preferred embodiment of a tyre according to the first aspect of the present invention and a preferred embodiment of a method according to the second aspect of the present invention, with reference to the following diagrammatic figure, in which:

FIG. 3 shows an isometric view of a part of the tyre from FIG. 1 in a third position;

FIG. 4 shows an isometric view of a tread pattern element according to the present invention;

FIG. 5 shows an isometric view of the tread pattern element from FIG. 4 in a divided position;

FIG. 6 shows an isometric view of a reinforcing frame;

FIG. 7 shows an isometric view of a reinforcing element;

FIG. 8 shows an isometric view of an assembly of parts of a tyre;

DETAILED DESCRIPTION

Figure 1:
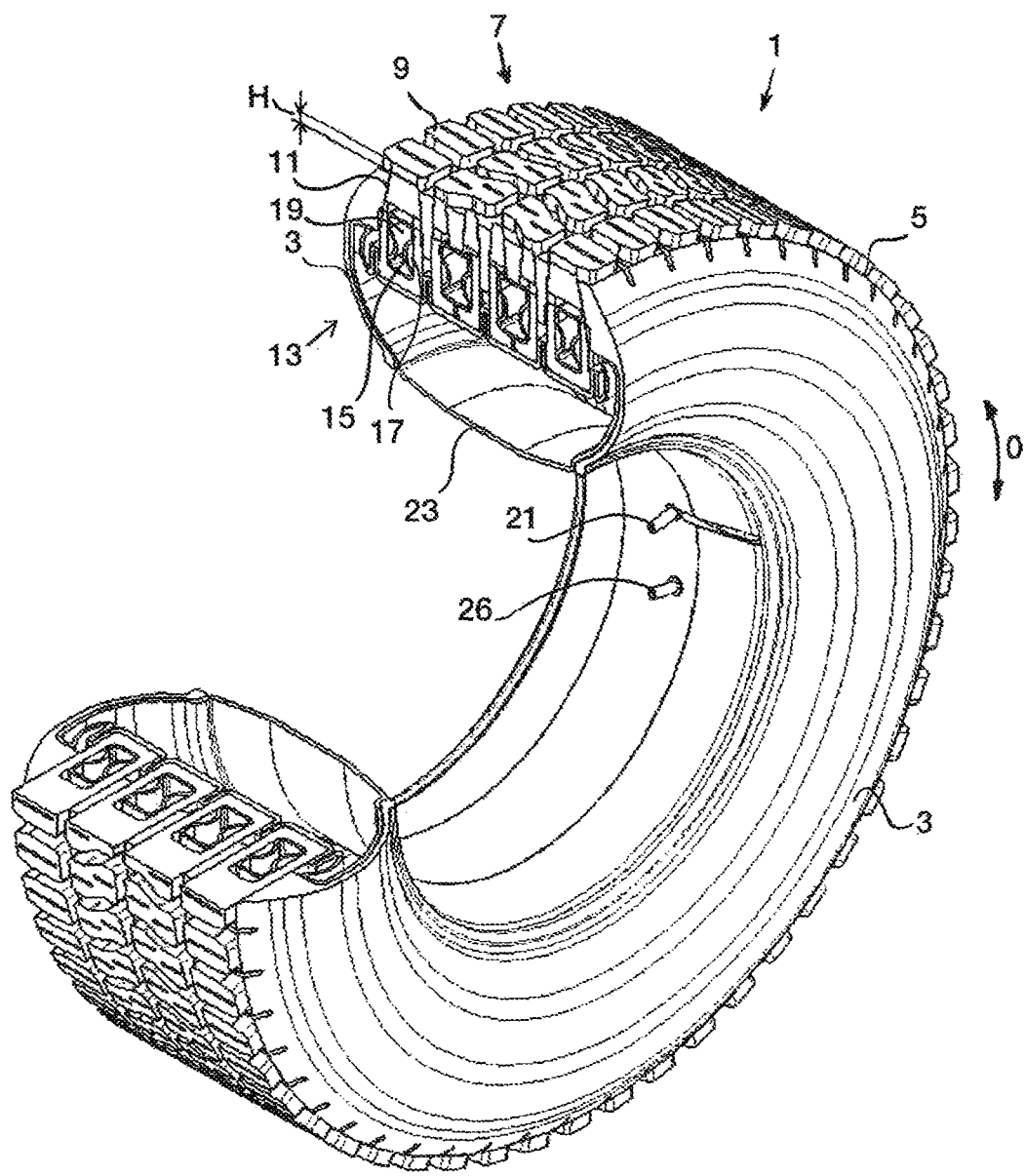
FIG. 1 shows an isometric view of a cut tyre in a first position according to the present invention.
Figure 2:
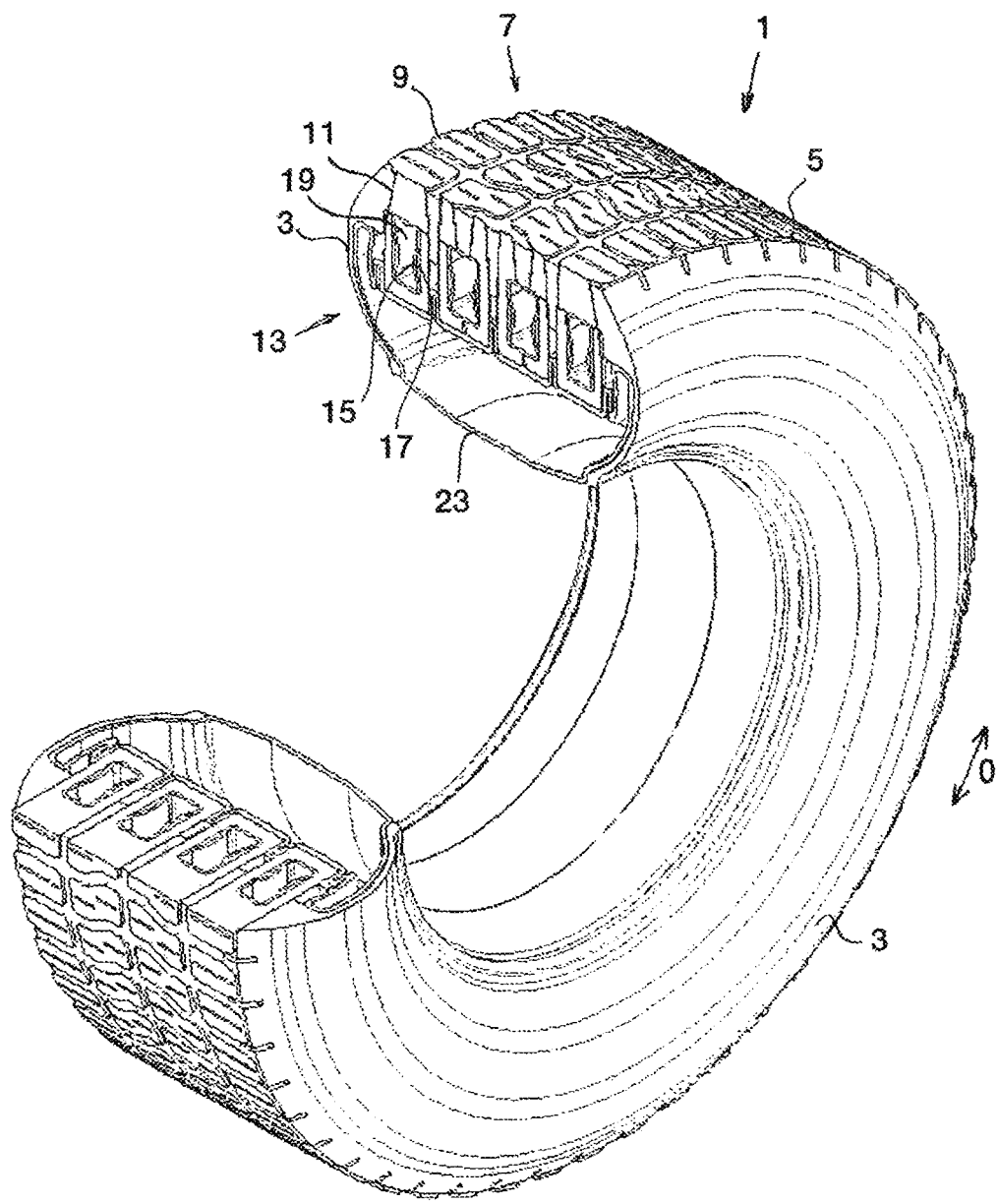
FIG. 2 shows an isometric view of the cut tyre from FIG. 1 in a second position.

In use, the tyre 1 shown in FIGS. 1, 2 and 3 is fitted on a rim (not shown in more detail) in order to be able to maintain an adjustable gas pressure in the tyre 1. The tyre has two side walls 3 which adjoin a circumferential wall 5. The circumferential wall 5 is provided with a profiled tread 7 in order to, for example, be able to discharge moisture which is present between the tyre 1 and the ground. The profiled tread 7 comprises tread pattern elements 9 which are movably provided in holding spaces, formed as passages 11, in the circumferential wall 5. By allowing the tread pattern elements 9 to project further from the circumferential wall 5, the tread pattern height H increases. An adjustment device 13 is provided in order to move the tread pattern elements 9 between a first position, in which they project from the circumferential wall 5 to a greater degree, and a second position, in which they project from the circumferential wall to a lesser degree. The adjustment device 13 comprises endless hollow cords 15 which extend in the circumferential direction O, that is to say the rolling direction of the tyre during use, through tread pattern elements 9. To this end, the tread pattern elements 9 are provided in rows, in the present example four rows, provided with passages 17 which are aligned in a circumferential direction O. The hollow cords 15 have a cavity 19 which can be filled with air and/or nitrogen via a filling opening 21 for adjusting the spring action of the hollow cords 15. By increasing the air and/or nitrogen pressure in the cavity 19, the spring stiffness of the hollow cords 15 increases. This leads to an increase in the force required to move the tread pattern elements 9 out of the circumferential wall 5, as a result of which the tread pattern height H decreases. With a reduction in the air and/or nitrogen pressure in the cavity 19, the spring stiffness decreases, as a result of which the force required to increase the tread pattern height H decreases.

Due to the presence of a set gas pressure, with the gas preferably being air and/or nitrogen, in an inner tube 23 of the tyre 1, the tread pattern elements 9 are moved out of the circumferential wall 5 as a result of the reduced spring stiffness of the hollow cords to increase the tread pattern height H. The pressure in the inner tube 23 is adjustable via valve 26. FIG. 2 shows the position in which the pressure in the cords 15 is relatively large with respect to the gas pressure in the inner tube 23, as a result of which the tread pattern elements 9 no longer, or at least hardly, project from the circumferential wall 5 in order to provide a tread at least virtually free from a tread pattern. In the position of the tyre 1 shown in FIG. 3, the tread pattern elements 9 project relatively far from the circumferential wall 5 in order to achieve a relatively large tread pattern height H. To this end, the pressure in the hollow cords 15 is reduced or the pressure in the inner tube 23 is increased with respect to the position shown in FIG. 2.

The hollow cords 15 are made of a material comprising rubber and are provided, on the side facing the circumferential wall 5, with a supporting body in the form of an endless tyre 25 made of a durable composite material. The hollow cords are bonded to the circumferential wall 5 by means of an adhesive.

On the side facing away from the circumferential wall 5, the tread pattern elements 9 rest on reinforcing elements 27. The reinforcing elements 27, an example of which is shown in FIG. 7, are incorporated in the wall of the inner tube 23. As a result of the gas pressure in the inner tube 23, the reinforcing elements 27 are pressed against the tread pattern elements 9 in order to distribute the pressure exerted by the inner tube 23 on the tread pattern elements 9 relatively evenly. The reinforcing elements 27 are made of a composite material.

The tread pattern elements 9 are composed of a tread pattern part 29 and a closing part 31. The tread pattern part 29 and the closing part 31 can be connected to each other by connecting pins 33. In order to produce a connection, the connecting pins 33 pass through a reinforcing frame 35 which is accommodated in the tread pattern elements 9. The reinforcing frame 35 is made of a composite material and is dividable along the dividing line of the tread pattern part 29 and the closing part 31. The tread pattern part 29 is provided with a tread pattern block 37 which is provided with a ribbed surface 39 on its outer side. In order to produce a tread pattern element 9, the reinforcing frame 25 is overmoulded with rubber in a mould and the rubber is vulcanised.

In order to replace a tread pattern element 9, the tread pattern element 9 is split, with the closing part 31 being detached from the tread pattern part 29. Subsequently, the hollow cord 15 is removed from the part of the passage surrounded by the tread pattern part 29, after which the tread pattern element 9 can be removed from the circumferential wall 5 on the side of the inner tube 23. A replacement tread pattern element can then be placed in the empty holding space in the circumferential wall 5, after which the cord 15 is arranged in the part of the replacement tread pattern element which is surrounded by the tread pattern part. Then, the closing part of the replacement tread pattern element is arranged on the tread pattern part of the replacement tread pattern element and fixed using connecting pins 33.

The filling opening 21 and the valve 26 are connected to a hub part 43 via hoses 41. The hub part 43 is accommodated in a rim 45 in order to be able to increase or decrease the pressure in the inner tube 23 and/or the hollow cords 15 in the fitted position of wheel 47. In an embodiment, the hub part 43 forms an integral part of the rim 45.

Figure 9:
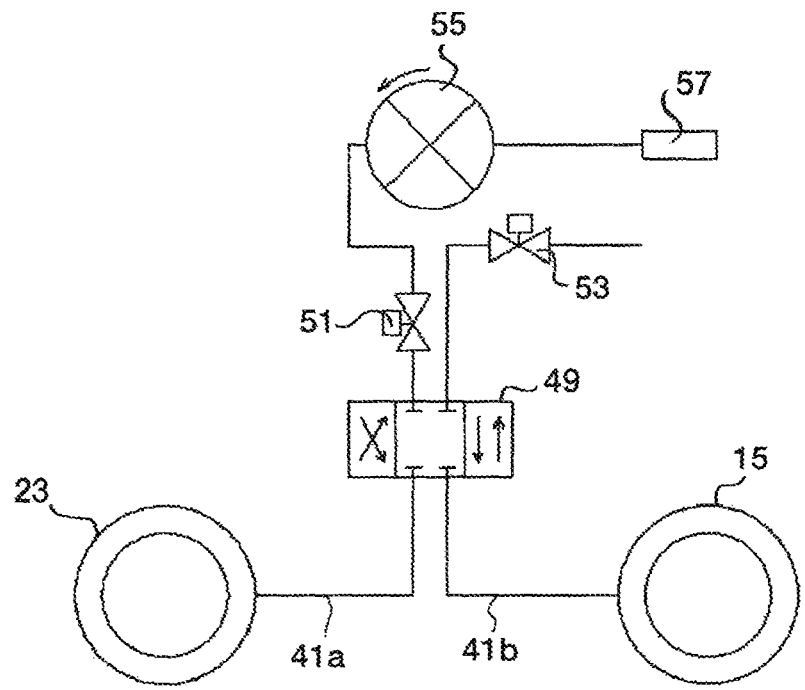
FIG. 9 shows a flow diagram of a tyre according to the present invention.
Figure 10:
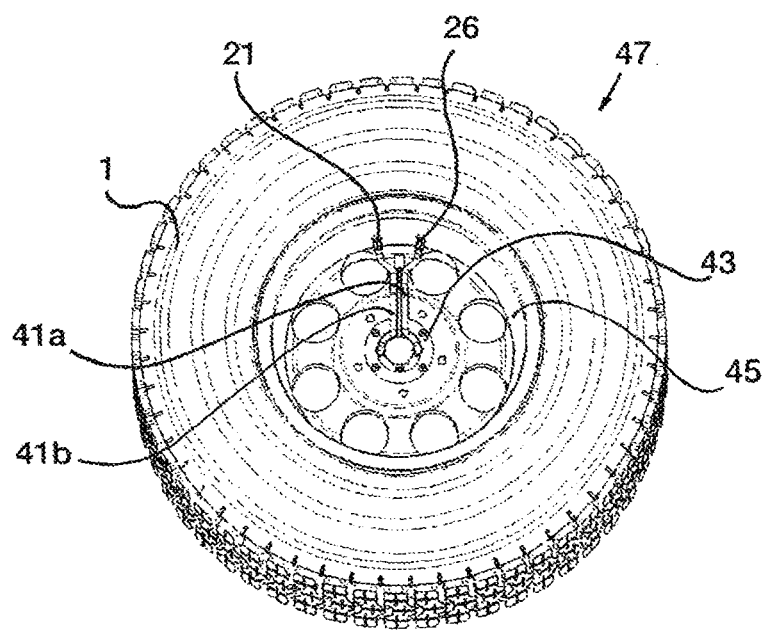
FIG. 10 shows an isometric view of a wheel according to the present invention.

The flow diagram shown in FIG. 9 illustrates a compressor 55 for compressing air and/or nitrogen. The air and/or nitrogen can be drawn in by compressor 55 via an air inlet 57. Air and/or nitrogen compressed by the compressor 55 can be supplied to the inner tube 23 via a closable valve 51 via a three-way valve 49 via hose 41a or to the hollow cord 15 via hose 41b, that is to say jointly to the hollow cords 15. Air and/or nitrogen which is present in the inner tube 23 and the hollow cord 15 can be discharged via the three-way valve 49 via closable valve 53.

The invention claimed is:

1. A tire for a wheel of a vehicle, with a profiled tread for supporting the vehicle on the ground, comprising:
    a tire body formed by two opposite side walls and a circumferential wall, wherein the tire body is configured to maintain an adjustable gas pressure in the tire, wherein the circumferential wall is provided with a number of holding spaces;
    a number of tread pattern elements which form at least part of the tread, wherein each of the number of tread pattern elements is accommodated in a holding space of the number of holding spaces so as to be displaceable at substantially right angles to the circumferential wall between a first position, in which it projects from the circumferential wall to a greater degree, and a second position, in which it projects from the circumferential wall to a lesser degree or is accommodated in the circumferential wall; and
    an adjustment device which is configured to displace the number of tread pattern elements in the number of holding spaces between the first and second position in order to adjust a tread pattern height of the profiled tread;
    wherein the adjustment device comprises a spring device which is configured with an adjustable spring action, wherein an increase in spring stiffness of the spring device increases an amount of force required to move the number of tread pattern elements from the second position to the first position, and a decrease in spring stiffness of the spring device decreases the amount of force required to move the number of tread pattern elements from the second position to the first position;

wherein the adjustment device is configured to adjust the degree of the spring action of the spring device, and wherein increasing the spring stiffness corresponds to a decreased tread pattern height and decreasing the spring stiffness corresponds to an increased tread pattern height; and wherein each of the number of tread pattern elements comprises a tread pattern part and a closing part removably attached to the tread pattern part, the tread pattern part and the closing part when attached forming a passage surrounded by the attached tread pattern part and the closing part, the passage aligned in a circumferential direction of the tire, and the adjustment device positioned in the passage.

2. The tire according to claim 1, wherein the tire is configured, for the benefit of each of the number of tread pattern elements, to offer resistance due to the maintainable gas pressure in the tire when displacing the number of tread pattern elements in the direction of the second position and configured to displace the number of tread pattern elements in the direction of the first position, in which it projects from the circumferential wall to a greater extent, when the gas pressure maintained in the tire is increased, wherein the adjustment device is also configured for adjusting the gas pressure maintained in the tire.

3. The tire according to claim 1, wherein each of the number of holding spaces extends through the circumferential wall and each of the number of tread pattern elements extends through the circumferential wall, wherein the spring device, on the side of the circumferential wall facing away from the tread, extends through the passage of each of the number of tread pattern elements and, for the benefit of the spring action, rests on the side of the circumferential wall facing away from the tread.

4. The tire according to claim 1, wherein the spring device comprises an endless hollow cord, wherein a cavity of the endless hollow cord can be filled with a fluid for adjusting the spring action of the spring device, wherein increasing fluid pressure in the cavity increases the spring stiffness of the spring device and decreasing fluid pressure in the cavity decreases the spring stiffness of the spring device.

5. The tire according to claim 1, wherein each tread pattern element of the number of tread pattern elements is made of a material comprising rubber.

6. The tire according to claim 1, wherein each tread pattern element of the number of tread pattern elements comprises the tread pattern part adjoining the tread, wherein the tread pattern part is provided with a ribbed surface on the side facing the holding space in order to discharge pollutants from the holding space to outside the tire.

7. The tire according to claim 1, wherein each of the number of tread pattern elements is provided with the passage, and wherein the adjustment device extends through the passage of each of the number of tread pattern elements.

8. The tire according to claim 7, wherein each tread pattern element of the number of tread pattern elements comprises a reinforcing frame surrounding the passage, wherein the reinforcing frame comprises a composite material.

9. The tire according to claim 7, wherein each tread pattern element of the number of tread pattern elements is formed as a composite tread pattern element, wherein the part of each tread pattern element of the number of tread pattern elements surrounding the passage is dividable in order to fit the adjustment device in the passage.

10. The tire according to claim 7, wherein the number of tread pattern elements is arranged in rows, with the spring device comprising a number of spring elements extending parallel to each other which corresponds to the number of rows of tread pattern elements and which are each configured to offer resistance due to spring action of the spring element, for the benefit of each of the number of tread pattern elements of a row of tread pattern elements, when moving the number of tread pattern elements of a row of tread pattern elements to the first position, in which it projects from the circumferential wall to a greater degree, in order to increase the tread pattern height, wherein each spring element extends through the passage of each of the number of tread pattern elements of the row of tread pattern elements.

11. The tire according to claim 10, wherein a reinforcing element is provided on the sides of the spring elements facing away from the tread in order to rest the spring elements and/or tread pattern elements on an inner tube provided in the tire.

\* \* \* \* \*